(12) United States Patent
Mai

(10) Patent No.: US 6,584,730 B1
(45) Date of Patent: Jul. 1, 2003

(54) FLOWERPOT

(76) Inventor: Chuan-Liang Mai, No. 175-1, Shuang-Cheng Rd., Hsintien City, Taipei Hsien (TW)

(*) Notice: Subject to any disclaimer, the term of this patent is extended or adjusted under 35 U.S.C. 154(b) by 0 days.

(21) Appl. No.: 10/307,948

(22) Filed: Dec. 3, 2002

(51) Int. Cl.[7] .............................................. A01G 27/02
(52) U.S. Cl. ............................................ 47/79; 47/48.5
(58) Field of Search ................................ 47/79, 80, 81, 47/48.5

(56) References Cited

U.S. PATENT DOCUMENTS

| | | | | | |
|---|---|---|---|---|---|
| 2,983,076 | A | * | 5/1961 | Merrill | 47/62 E |
| 4,335,540 | A | * | 6/1982 | Allen | 47/79 |
| 4,356,665 | A | * | 11/1982 | de Oliveira | 47/80 |
| 4,787,169 | A | * | 11/1988 | Maxfield et al. | 43/57 |
| D313,203 | S | * | 12/1990 | Carlson | D11/153 |
| 5,097,626 | A | * | 3/1992 | Mordoch | 47/79 |
| 5,596,839 | A | * | 1/1997 | Ellis-El | 47/79 |
| 6,138,411 | A | * | 10/2000 | Lin | 47/79 |
| 6,145,250 | A | * | 11/2000 | Mai | 47/79 |

FOREIGN PATENT DOCUMENTS

| | | | | |
|---|---|---|---|---|
| DE | 29718416 U1 | * | 2/1998 | A01G/9/02 |
| EP | 61413 A1 | * | 9/1982 | A01G/27/00 |
| GB | 2131663 A | * | 6/1984 | A01G/9/24 |
| JP | 2000139248 A | * | 5/2000 | A01G/27/00 |

* cited by examiner

Primary Examiner—Michael J. Carone
Assistant Examiner—Son T. Nguyen
(74) Attorney, Agent, or Firm—Rabin & Berdo, P.C.

(57) ABSTRACT

A flowerpot includes a shoulder adapted to be formed on an inner periphery of the second pot and a watering system provided to be received in the second pot and supported by the shoulder of the second pot. The watering system has channels to communicate an inside of the watering system with the inside of the second pot and a passage defined inside the watering system for receiving therein the nozzle of the pump. When the water is pumped out of the first pot by the pump via the bellow, the water is pumped inside the watering system and after the water inside the watering system is full, the water spills out of the watering system from the channels of the watering system to evenly water the plant in the second pot.

11 Claims, 5 Drawing Sheets

FLOWERPOT

CROSS REFERENCE

Applicant of this application filed an application on Apr. 30, 1999, with the application Ser. No. 09/305,795. The application "FLOWERPOT" was issued into a patent with a U.S. Pat. No. 6,145,250 on Nov. 14, 2000. The patent is now taken into consideration and for reference hereinafter.

BACKGROUND OF THE INVENTION

1. Field of the Invention

The present invention relates to a flowerpot capable of evenly watering the plant inside the flowerpot and being able to provide hollow legs on a bottom face of the second pot to allow the plant root to have access to the water stored in the first pot such that even after a long period of time not watering the plant, the plant still has water for living.

2. Description of Related Art

When watering a plant in a pot, the user always wants the plant to be evenly watered. However, the available watering kit in the market seems unable to accomplish the expected goal. The only way to achieve the purpose is that the user holds a watering can filled with water to sprinkle the water to every part in the flowerpot. If the quantity of the flowerpots is small, the user can still manage to water all the plants without great difficulty. However, if there are very many flowerpots to be watered, the user is not able to complete the entire work alone by holding the watering can and watering around. Using an automatic watering system seems to be a good solution to accomplish the work of evenly watering the plantsbut the user will still face a problem of excessive cost if there is not a large quantity of flowerpots to be watered. The aforementioned U.S. Pat. No. (6,145,250; '250) discloses a flowerpot having a pump to water the plant received in the flowerpot. The outlet of the pump is fixed at one position so that only a certain portion of the plant is watered. Under such a circumstance, the growing of the plant will be affected by the watering method.

To overcome the problem, the invention aims to provide an improved flowerpot to mitigate and/or obviate the aforementioned problems.

SUMMARY OF THE INVENTION

The main object of the present invention is to provide a flowerpot having a watering system to evenly provide water to the plant in the flowerpot.

Another objective of the present invention is to provide at least one hollow leg on a bottom face of the second pot to allow the plant root to have access to the water stored in the first pot which is detachably placed under the second pot such that even after a long period of time of not watering the plant, the plant still has water for survival.

Still, another objective of the present invention is to provide a drainage plug to stop water from flowing out of the first pot when moving the flowerpot.

The detailed features of the present invention will be apparent in the detailed description with appropriate reference to the accompanying drawings.

DETAILED DESCRIPTION OF THE PREFERRED EMBODIMENT

Figure 1:
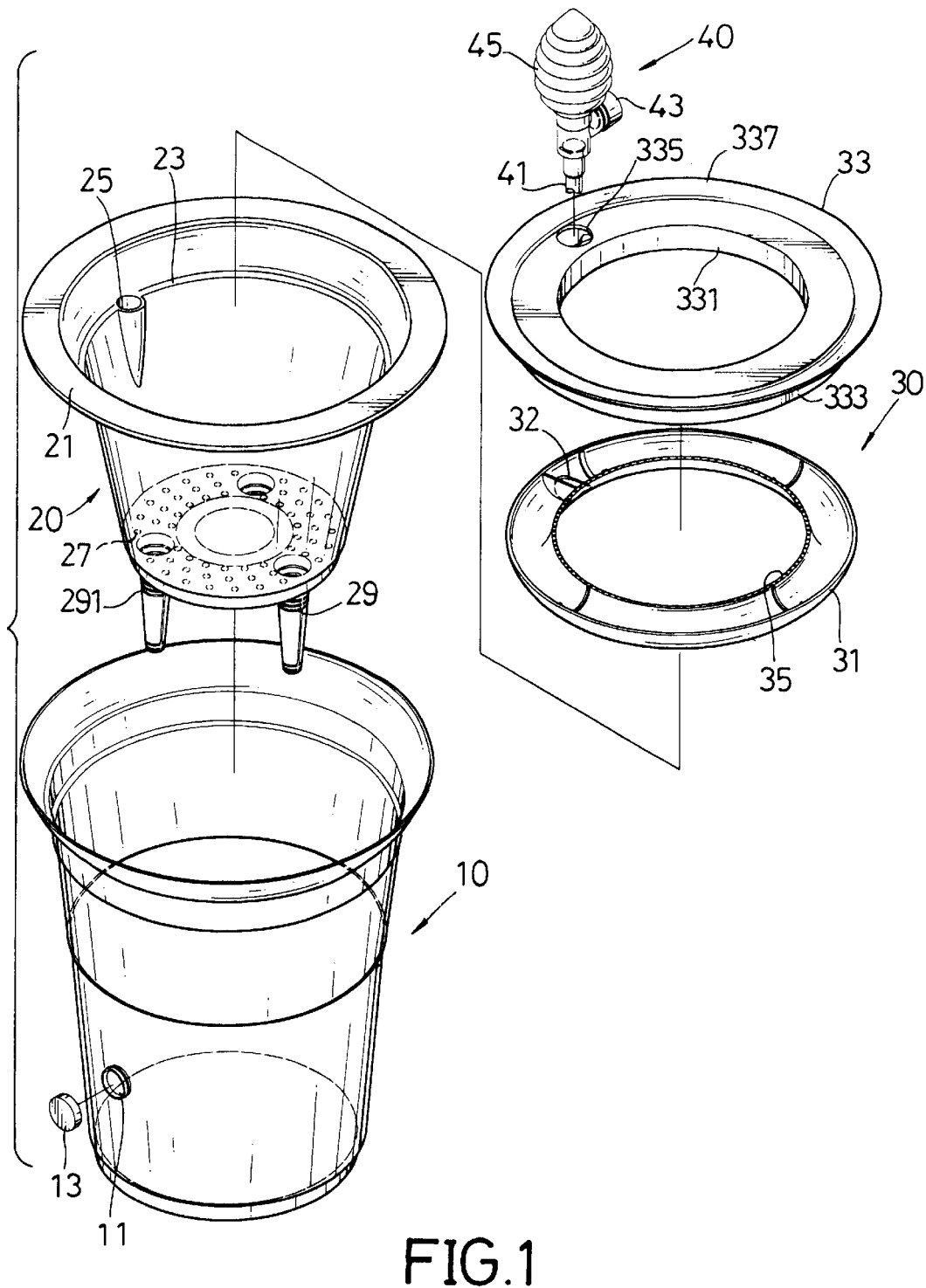
FIG. 1 is an exploded perspective view of a flowerpot in accordance with the present invention.

With reference to FIG. 1, the flowerpot in accordance with the present invention has a first pot (10), a second pot (20), a watering system (30) and a pump (40).

The first pot (10) has an outlet (11) communicating with inside of the first pot (10), a drainage plug (13) detachably connected to the outlet (11) in a watertight manner.

The second pot (20) has a first flange (21) corresponding to an upper edge of the first pot (10), a shoulder (23) integrally formed on an inner periphery of the second pot (20), a first through hole (25) communicating with the inside of the first pot (10), multiple apertures (27) defined in a bottom face of the second pot (20) to communicate an inside of the second pot (20) with the inside of the first pot (10) and at least one hollow leg (29) (three are shown in this embodiment) extending out from the bottom of the second pot (20). The (at least one )leg (29) has slits (291) defined through a periphery of the (at least one hollow )leg (29) so as to communicate the inside of the (at least one hollow )leg (29) with the outside of the (at least one hollow )leg (29). Water absorbent material, such as sponge, dirt may be added into the at least one hollow leg (29) to maintain moist in the at least one hollow leg (29).

The watering system (30) includes a first hollow disk (31) and a second hollow disk (33). The first hollow disk (31) is configured to have a U-shape in cross section and has an outer diameter the same as the diameter of the shoulder (23). The first hollow disk (31) has a second through hole (32) corresponding to the first through hole (25) of the second pot (20). Furthermore, the first hollow disk (31) has multiple channels (35) defined in an inner edge of the first hollow disk (31). The second hollow disk (33) has an inner wall (331) and an outer wall (333) both integrally formed on a bottom face of the second hollow disk (33). The inner wall (331) corresponds to the inner edge of the first hollow disk (31) and the outer wall (333) corresponds to an outer edge of the first hollow disk (31). The second hollow disk (33) further has a third through hole (335) defined through the second hollow disk (33) and a second flange (337) formed to correspond to the first flange (21) of the second pot (20).

The pump (40) has a bellow (41) extending through the third through hole (335), the second through hole (32) and the first through hole (25), a nozzle (43) formed on a side of the bellow (41) and a ball (45) formed on a distal end of the bellow (41).

Figure 2:
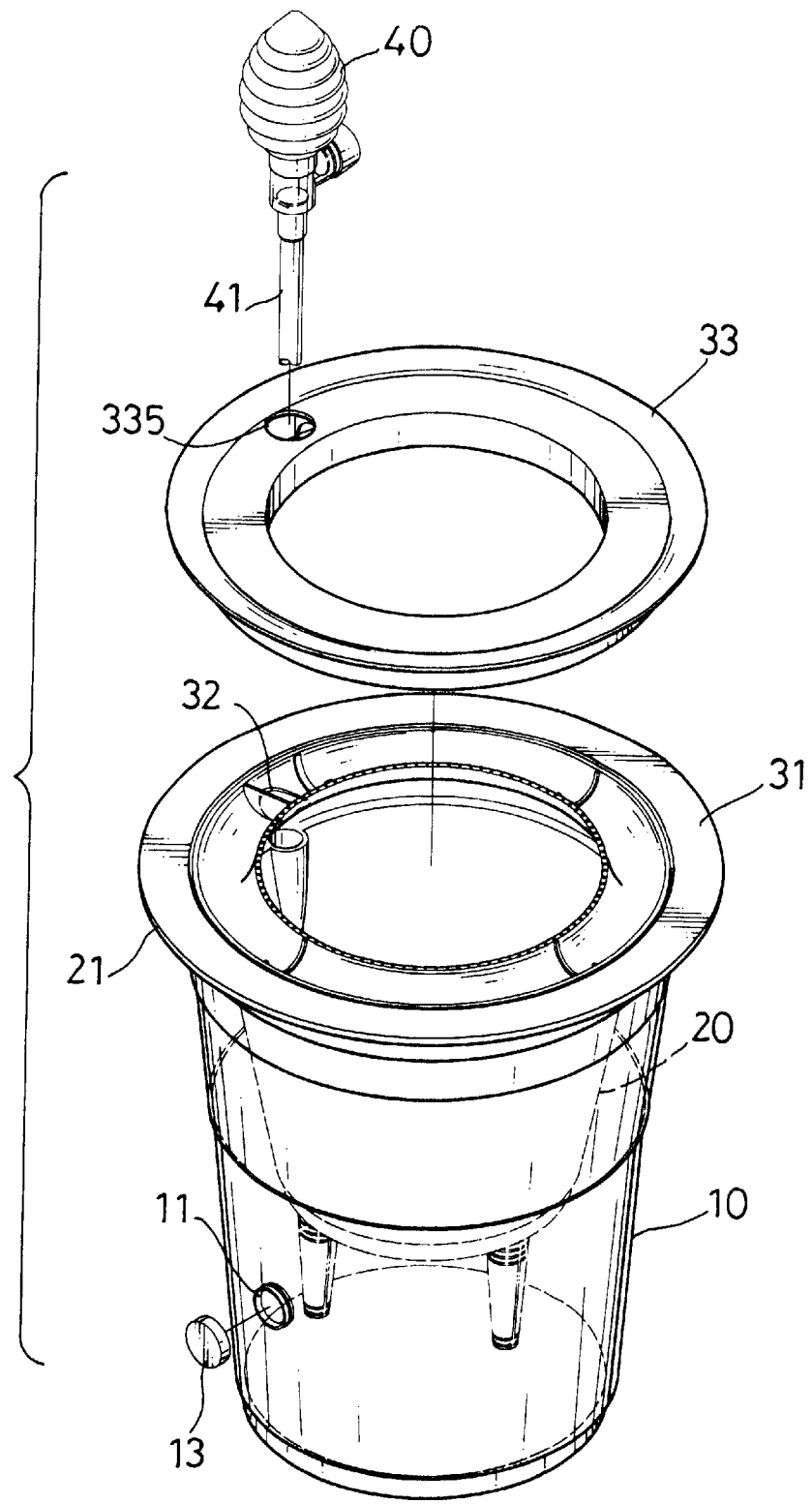
FIG. 2 is a partial exploded perspective view of the flowerpot shown in FIG. 1 with the first hollow disk received and supported by the second pot.

With reference to FIG. 2 and still taking FIG. 1 for reference, in assembly, the second pot (20) is placed inside the first pot (10) and the first flange (21) is supported by an outer edge of the first pot (10). Then the first hollow disk (31) is placed in the second pot (20) and supported by the shoulder (23).

Figure 3:
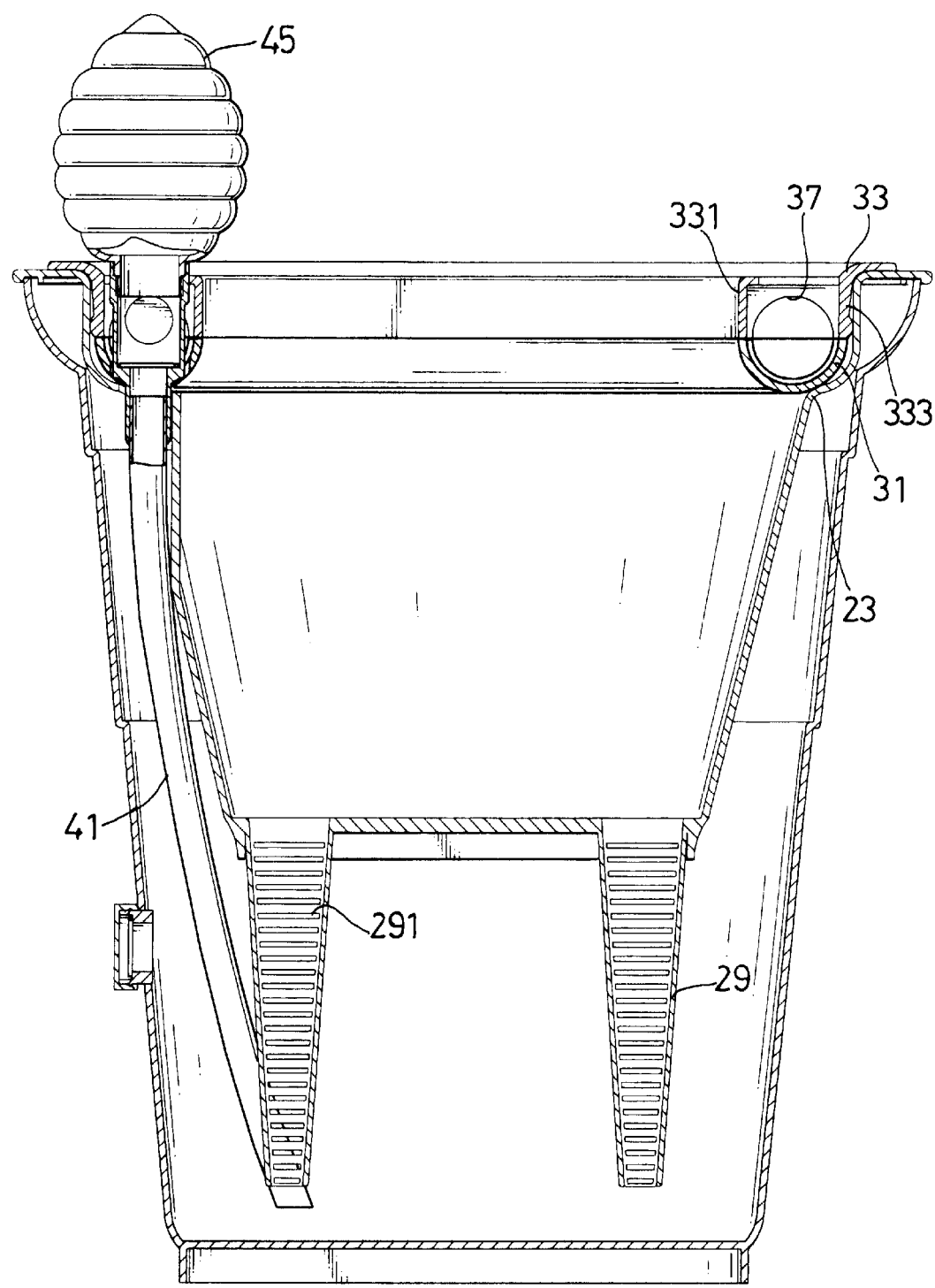
FIG. 3 is a cross sectional view of the flowerpot in FIG. 1.

With reference to FIG. 3, after the first hollow disk (31) is received in the second pot (20) and supported by the shoulder (23), the second hollow disk (33) is placed on top of the first hollow disk (31) so that the inner wall (331) corresponds to the inner edge of the first hollow disk (31) and the outer wall (333) corresponds to the outer edge of the first hollow disk (31). After the second hollow disk (33) mates the first hollow disk (31), due to the U-shaped configuration of the first hollow disk (31), a passage (37) is defined between the first hollow disk (31) and the second hollow disk (33). Thereafter, the bellow (41) extends through the third through hole (335), the second through hole (32) and the first through hole (25) and reaches the bottom of the first pot (10). The nozzle (43) is received between the first hollow disk (31) and the second hollow disk (33) and supported by the first hollow disk (31).

Figure 4:
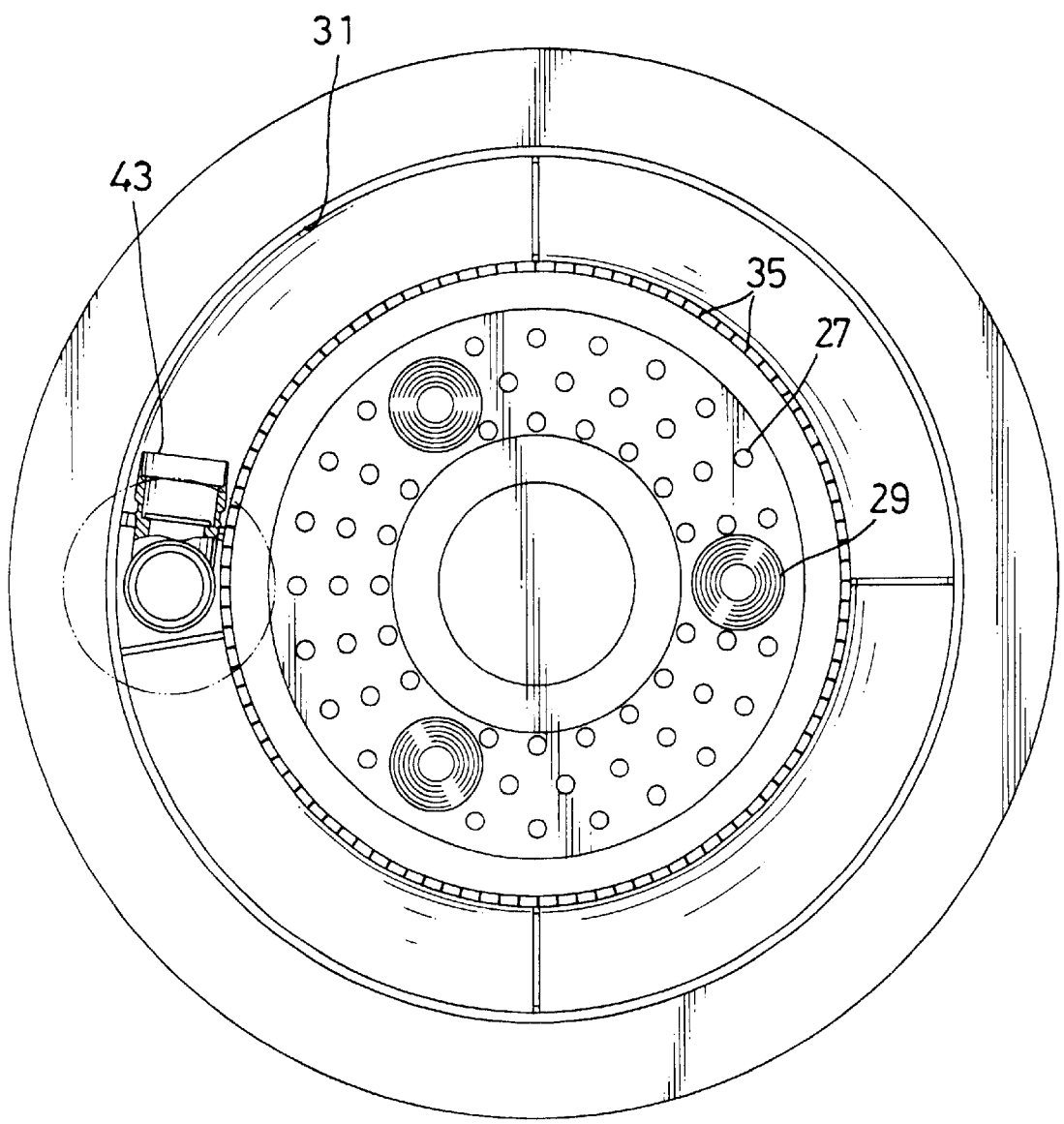
FIG. 4 is a top plan view of the flowerpot with the second hollow disk removed.

With reference to FIG. 4, it is noted after the nozzle (43) is supported by the first hollow disk (31), the apertures (27) and the at least one hollow leg (29) communicate with the inside of the first pot (10).

Figure 5:
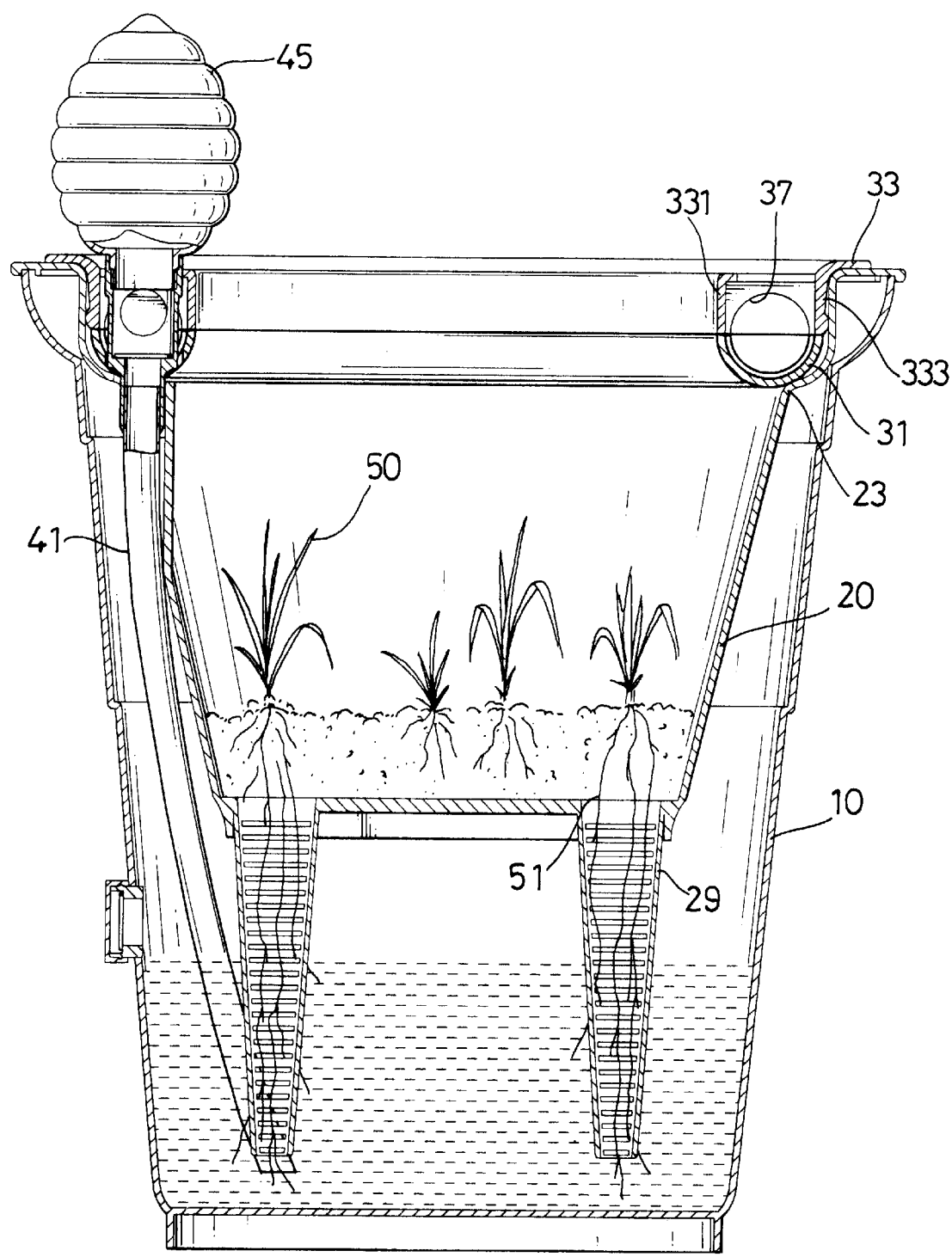
FIG. 5 is a schematic view of the plant root extending into the hollow legs to have access to the water in the first pot.

With reference to FIG. 5, after the completion of the assembly of the flowerpot of the present invention, water is stored in the first pot (10) with the drainage plug (13) sealing the outlet (11) to avoid water inside the first pot (10) from flowing out. When a plant (50) is planted in the second pot (20) and watered, the user pumps the ball (45) to suck water out of the first pot (10). After the water is pumped upward along the bellow (41), the water flows into the passage (37). When the passage (37) is full of water, the water will spill over from the channels (35). Because the channels (35) are defined around the inner edge of the first hollow disk (31), the plant (50) is evenly watered. However, if the water is too much for the plant (50), the excess water is able to flow through the apertures (27) of the second pot and be stored in the first pot (10). The hollow leg (29) provides an access for the plant root (51) to the water in the first pot (10) so that.even after a long period of time of not watering the plant (50), due to the slits (291) being immersed in the water, the plant root (51) extending into the hollow leg (29) still has a way of getting the water.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. In a flowerpot having a first pot for receiving therein water, a second pot detachably received in the first pot and having multiple apertures defined in a bottom of the second pot to communicate an inside of the second pot with an inside of the first pot and having a first through hole and a pump with a bellow extending through the first through hole of the second pot and into the inside of the first pot, a nozzle communicating with the bellow such that the pump is able to pump water out of the first pot, wherein the improvement comprises:

a shoulder is adapted to be formed on an inner periphery of the second pot, a watering system is provided to be received in the second pot and supported by the shoulder of the second pot and has channels adapted to communicate an inside of the watering system with the inside of the second pot and a passage defined inside the watering system for receiving therein the nozzle of the pump, whereby when the water is pumped out of the first pot by the pump via the bellow, the water is pumped inside the watering system and after the water inside the watering system reaches a predetermined amount, the water spills out of the watering system from the channels of the watering system to evenly water the plant in the second pot.

2. The flowerpot as claimed in claim 1, wherein the watering system has a first hollow disk configured to have a U-shaped configuration and having a second through hole defined to allow extension of the bellow of the pump, and wherein the channels are defined in an inner edge of the first hollow disk.

3. The flowerpot as claimed in claim 1, wherein the watering system further comprises a second hollow disk detachably mounted on top of the first hollow disk and has an inner wall corresponding to the inner edge of the first hollow disk and an outer wall corresponding to an outer edge of the first hollow disk, and the passage is defined between the first hollow disk and the second hollow disk.

4. The flowerpot as claimed in claim 3 further comprising at least one hollow leg adapted to be formed on a bottom of the second pot to provide communication between the inside of the second pot with the inside of the first pot.

5. The flowerpot as claimed in claim 4, wherein the first hollow disk has a diameter the same as that of the shoulder so that after the watering system is received in the second pot, the watering system is supported by the shoulder.

6. The flowerpot as claimed in claim 5 further having an outlet adapted to be defined through an outer periphery of the first pot and a drainage plug to cover the outlet in a watertight manner.

7. The flowerpot as claimed in claim 4 further having an outlet adapted to be defined through an outer periphery of the first pot and a drainage plug to cover the outlet in a watertight manner.

8. The flowerpot as claimed in claim 2, wherein the first hollow disk has a diameter the same as that of the shoulder so that after the watering system is received in the second pot, the watering system is supported by the shoulder.

9. The flowerpot as claimed in claim 2 further having an outlet adapted to be defined through an outer periphery of the first pot and a drainage plug to cover the outlet in a watertight manner.

10. The flowerpot as claimed in claim 1 further comprising at least one hollow leg adapted to be formed on a bottom of the second pot to provide communication between the inside of the second pot with the inside of the first pot.

11. The flowerpot as claimed in claim 1 further having an outlet adapted to be defined through an outer periphery of the first pot and a drainage plug to cover the outlet in a watertight manner.

* * * * *